United States Patent
Hsu

(10) Patent No.: US 7,866,892 B2
(45) Date of Patent: Jan. 11, 2011

(54) ROTATOR FOR A HEAD TUBE OF A BICYCLE

(76) Inventor: Chia-Wei Hsu, No. 1, Lane 394, Sec. 6, Jhanglu Rd., Fusing Hsiang, Changhua Hsien (TW)

( * ) Notice: Subject to any disclaimer, the term of this patent is extended or adjusted under 35 U.S.C. 154(b) by 462 days.

(21) Appl. No.: 12/081,514

(22) Filed: Apr. 17, 2008

(65) Prior Publication Data

US 2009/0261554 A1    Oct. 22, 2009

(51) Int. Cl.
F16C 43/08 (2006.01)
F16C 13/02 (2006.01)

(52) U.S. Cl. .................. 384/510; 384/546; 280/279

(58) Field of Classification Search ............... 384/510, 384/517, 538–537, 540, 545–546; 403/290, 403/370, 371; 280/272, 279–280; 74/551.1–551.8
See application file for complete search history.

(56) References Cited

U.S. PATENT DOCUMENTS

| | | | |
|---|---|---|---|
| 5,330,220 A * | 7/1994 | Nagano | 280/279 |
| 5,775,709 A * | 7/1998 | Chen | 384/538 |
| 5,791,671 A * | 8/1998 | Tang et al. | 74/551.1 |
| 5,823,556 A * | 10/1998 | Chi | 384/545 |
| 5,964,474 A * | 10/1999 | Chen | 280/279 |
| 6,343,806 B1 * | 2/2002 | Lee | 280/272 |
| 6,651,525 B2 * | 11/2003 | Jiang | 74/551.1 |
| 6,883,818 B1 * | 4/2005 | Chiang | 384/538 |
| 2005/0093268 A1 * | 5/2005 | Chiang | 280/279 |

FOREIGN PATENT DOCUMENTS

GB    2328913 A  *  3/1999

* cited by examiner

*Primary Examiner*—Marcus Charles
(74) *Attorney, Agent, or Firm*—Muncy, Geissler, Olds & Lowe, PLLC

(57) ABSTRACT

A rotator for a head tube of a bicycle has a mounting bracket, a rotating collar and a holding ring. The mounting bracket is mounted around the head tube and has a mounting ring and two legs. The mounting ring is mounted around the head tube and has a mounting channel, a kerf, an annular flange and a holding groove. The legs are oppositely mounted on the mounting ring. The rotating collar is rotatably mounted around the mounting bracket and has a chamber, an upper through hole, a lower through hole, a mounting channel and multiple balls. The holding ring is mounted in the mounting ring of the mounting bracket and has an engaging groove. The engaging groove engages the annular flange on the mounting ring.

7 Claims, 7 Drawing Sheets

US 7,866,892 B2

ROTATOR FOR A HEAD TUBE OF A BICYCLE

BACKGROUND OF THE INVENTION

1. Field of the Invention

The present invention relates to a rotator, and more particularly to a rotator for a head tube of a bicycle and that is easily assembled.

2. Description of Related Art

With reference to FIG. 7, a conventional rotator (60) is mounted on a head tube of a bicycle and has a mounting bracket (61), a rotating collar (62) and a cover (63). The mounting bracket (61) is mounted securely around head tube of the bicycle and has an external surface and an inserting gap (611). The inserting gap (611) is formed in the external surface of the mounting bracket (61). The rotating collar (62) is mounted rotatably around the mounting bracket (61) and has an internal surface, an inserting gap (621) and multiple balls (64). The inserting gap (621) is formed in the internal surface of the rotating collar (62) and corresponding to the inserting gap (611) of the mounting bracket (61). The balls (64) are mounted between the mounting bracket (61) and the rotating collar (62) from inserting gaps (611, 621) to make the rotating collar (62) rotating relative to the mounting bracket (61). The cover (63) is mounted on the mounting bracket (61) and the rotating collar (62) to prevent dusty or impurities from clogging with the balls (64) between the mounting bracket (61) and the rotating collar (62).

To assemble the rotator (60), the rotating collar (62) is rotated to a position where the inserting gap (621) aligns with the inserting gap (611) in the mounting bracket (61). Then, the balls (64) are put between the mounting bracket (61) and the rotating collar (62) via the inserting gaps (611, 621) one by one. Therefore, assembling the conventional rotator (60) is inconvenient and time-consuming. Furthermore, the conventional rotator needs to put the cover (63) between the mounting bracket (61) and the rotating collar (62) to prevent dusty or impurities from clogging with the balls (64).

To overcome the shortcomings, the present invention provides a rotator to mitigate or obviate the aforementioned problems.

SUMMARY OF THE INVENTION

The main objective of the present invention is to provide a rotator for a head tube of a bicycle that is easily assembled.

The rotator for a head tube of a bicycle in accordance with the present invention has a mounting bracket, a rotating collar and a holding ring. The mounting bracket is mounted around the head tube and has a mounting ring and two legs. The mounting ring is mounted around the head tube and has a mounting channel, a kerf, an annular flange and a holding groove. The legs are oppositely mounted on the mounting ring. The rotating collar is rotatably mounted around the mounting bracket and has a chamber, an upper through hole, a lower through hole, a mounting channel and multiple balls. The holding ring is mounted in the mounting ring of the mounting bracket and has an engaging groove. The engaging groove engages the annular flange. With the holding ring being pressed into the mounting ring, the holding ring will provide a pressing force against the mounting ring to make the mounting ring squeezing the balls in cooperation with the rotating collar, and this can prevent the mounting bracket from detaching from the rotating collar and the balls from dropping out of the mounting ring.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
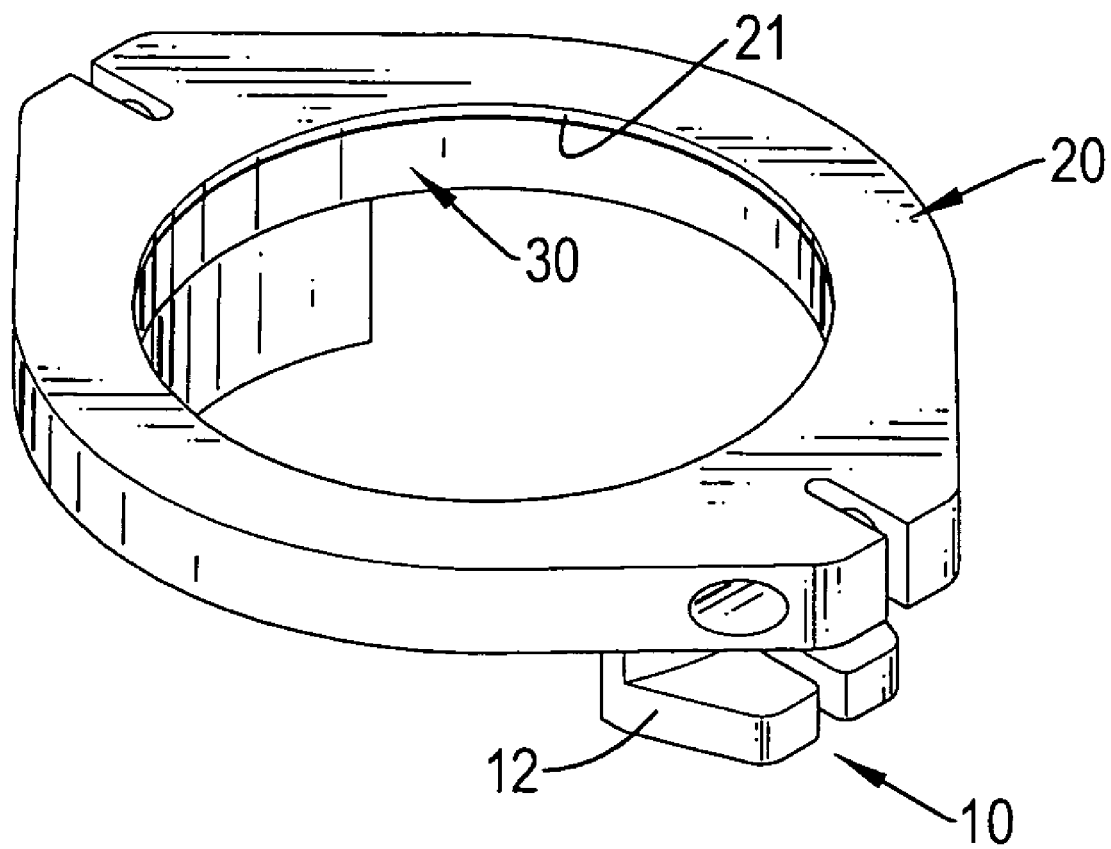
FIG. 1 is a perspective side view of a rotator for a head tube of a bicycle in accordance with the present invention.
Figure 2:
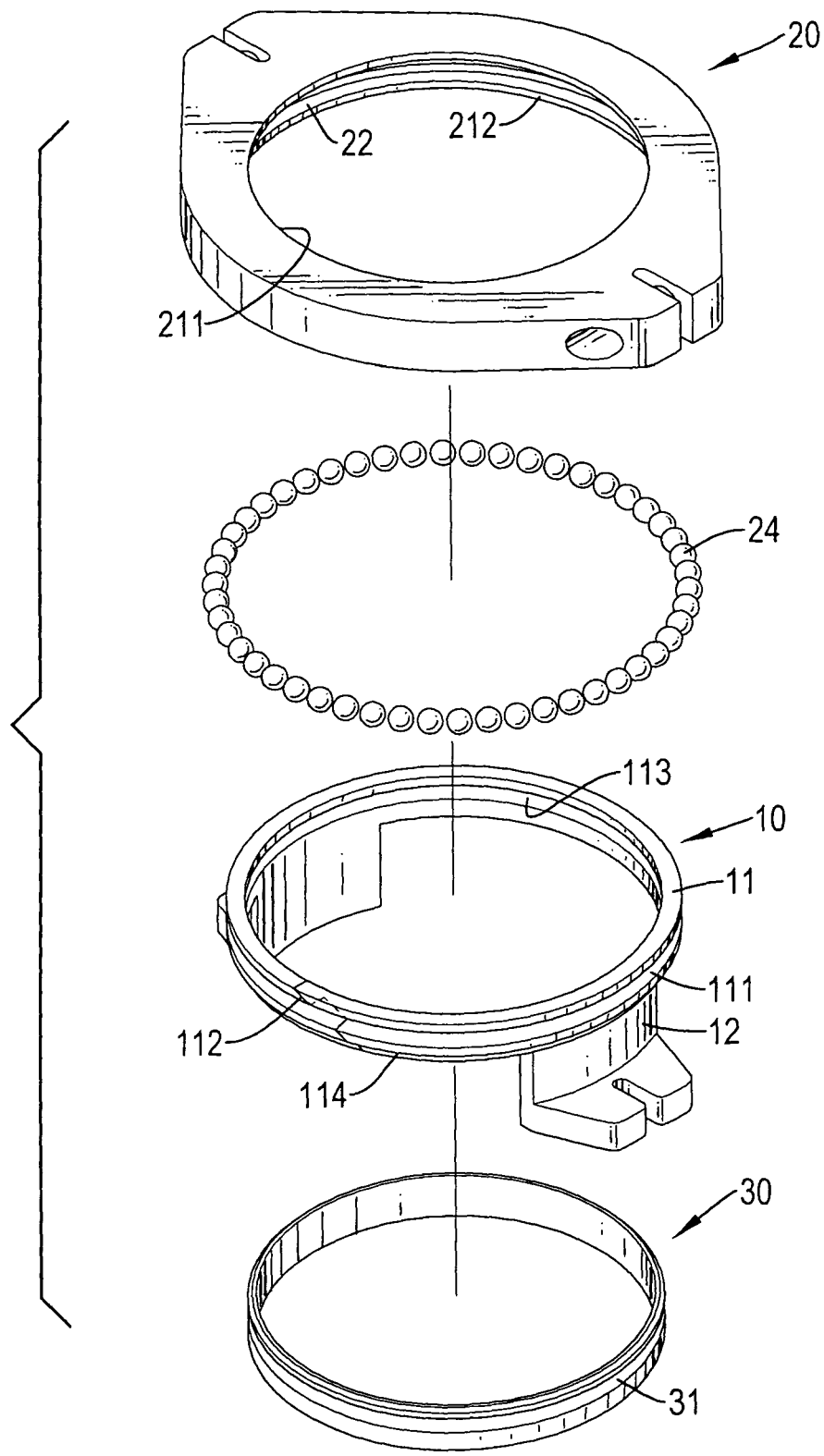
FIG. 2 is an exploded perspective view of the rotator in FIG. 1.
Figure 3:
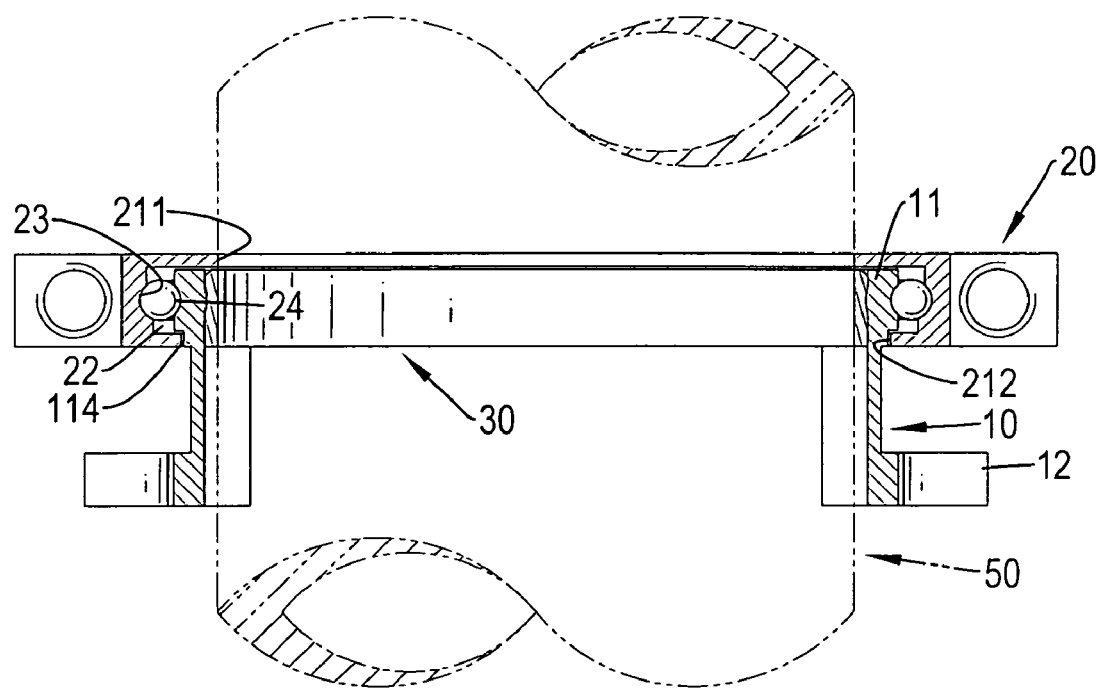
FIG. 3 is an operational side view of the rotator in FIG. 1 mounted on a head tube of a bicycle.

With reference to FIGS. 1 to 3, a rotator in accordance with the present invention for a head tube (50) of a bicycle has a mounting bracket (10), a rotating collar (20) and a holding ring (30).

The mounting bracket (10) is mounted around the head tube (50) of the bicycle and has a mounting ring (11) and two legs (12).

The mounting ring (11) is mounted around the head tube (50) and has an external surface, an inner surface, a bottom, a mounting channel (111), a kerf (112), an annular flange (113) and a holding groove (114). The mounting channel (111) is annularly formed around the external surface of the mounting ring (11). The kerf (112) is obliquely formed through the mounting ring (11) to form two inclined edges, and the kerf (112) may be formed through the mounting ring (11) at an angle of 30° relative to the bottom of the mounting ring (11). The annular flange (113) is annularly formed on and protrudes from the internal surface of the mounting ring (11). The holding groove (114) is annularly formed around the external surface of the mounting ring (11) below the mounting channel (111). The legs (12) may be L-shaped and are oppositely mounted on the bottom of the mounting ring (11).

The rotating collar (20) is rotatably mounted around the mounting bracket (10) and has a top, a bottom, a chamber (22), an upper through hole (211), a lower through hole (212), a mounting channel (23) and multiple balls (24).

The chamber (22) is defined in the rotating collar (20) between the top and the bottom and has an inner surface and grease (40). The grease (40) is filled in the inner surface of the chamber (22). The upper through hole (211) is formed through the top of the rotating collar (20), communicates with the chamber (22) and has a diameter smaller than that of the chamber (22). The lower through hole (212) is formed through the bottom of the rotating collar (20), communicates with the chamber (22) and the upper through hole (211) and has a diameter larger than that of the upper through hole (211) but smaller than that of the mounting ring (11). In the embodiment, the holding groove (114) corresponds to the lower through hole (212) in the rotating collar (20). The mounting channel (23) is annularly formed in the inner surface of the chamber (22) and communicates with the mounting channel (111) of the mounting ring (11).

The balls (24) are mounted rotatably in the mounting channels (111, 23) between the mounting ring (11) and the rotating collar (22) to make the rotating collar (20) rotating relative to the mounting ring (11) of the mounting bracket (10) smoothly.

The holding ring (30) is mounted in the mounting ring (11) of the mounting bracket (10) and has an outer surface, a diameter and an engaging groove (31). The diameter of the holding ring (30) is same as that of the upper through hole (211). The engaging groove (31) is formed around the outer surface of the holding ring (30) and is engaged the annular flange (113). With the holding ring (30) being pressed into the mounting ring (11), the holding ring (30) will provide a pressing force against the mounting ring (11) to make the mounting ring (11) squeezing the balls (24) in cooperation with the rotating collar (20), and this can prevent the mounting bracket (10) from detaching from the rotating collar (20) and the balls (24) from dropping out of the mounting ring (11).

Figure 4:
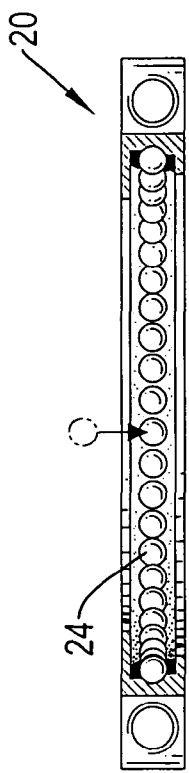
FIGS. 4 to 6 are side views in partial section of assembling the rotator in FIG. 1.
Figure 4:
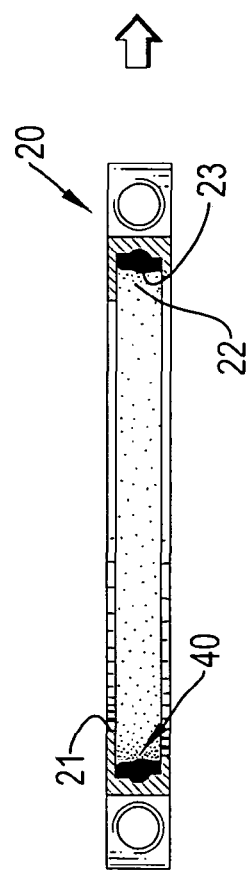
Figure 5:
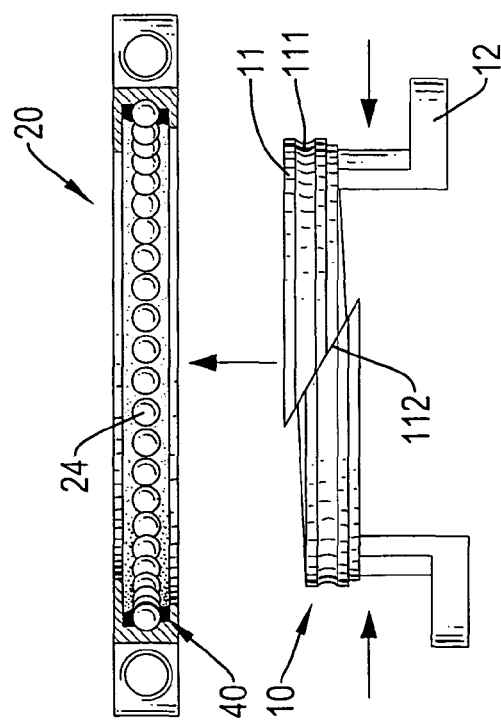
Figure 5:
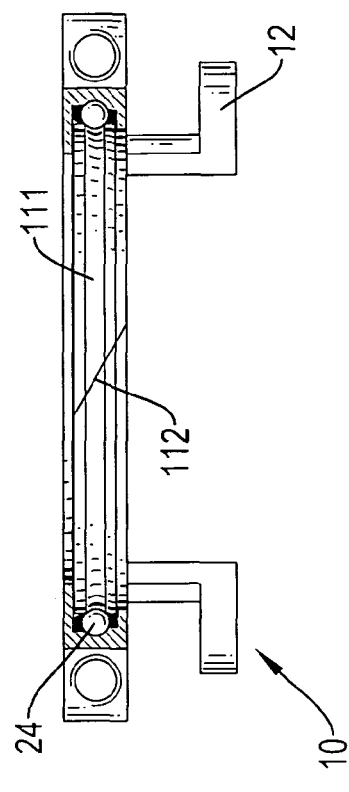
Figure 6:
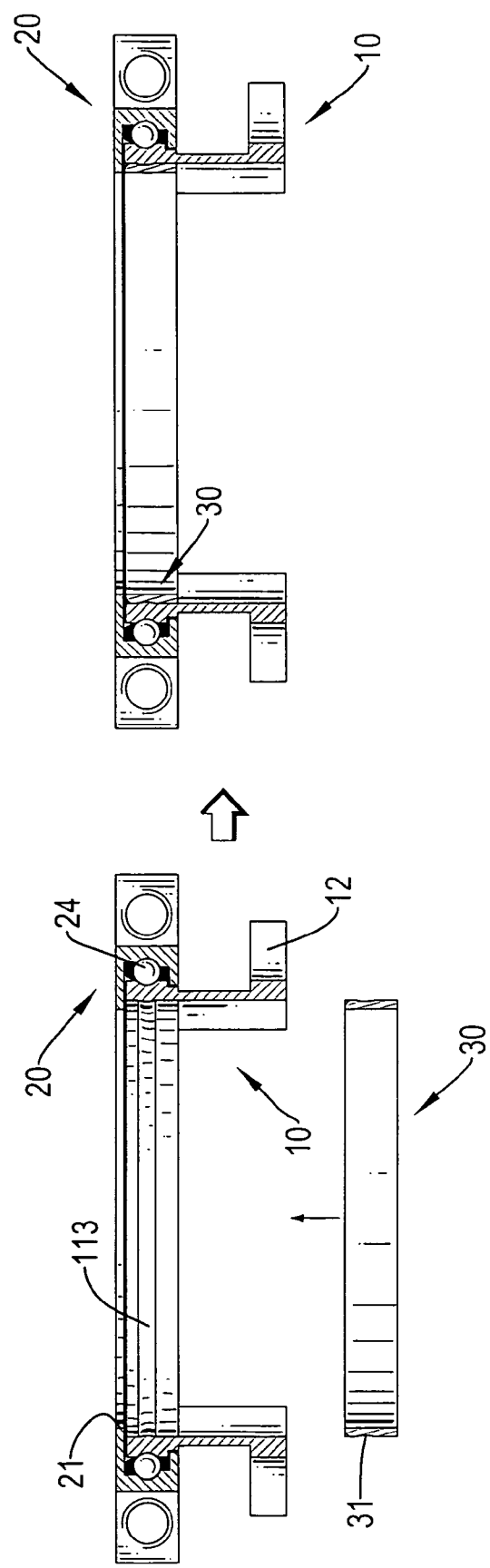
Figure 7:
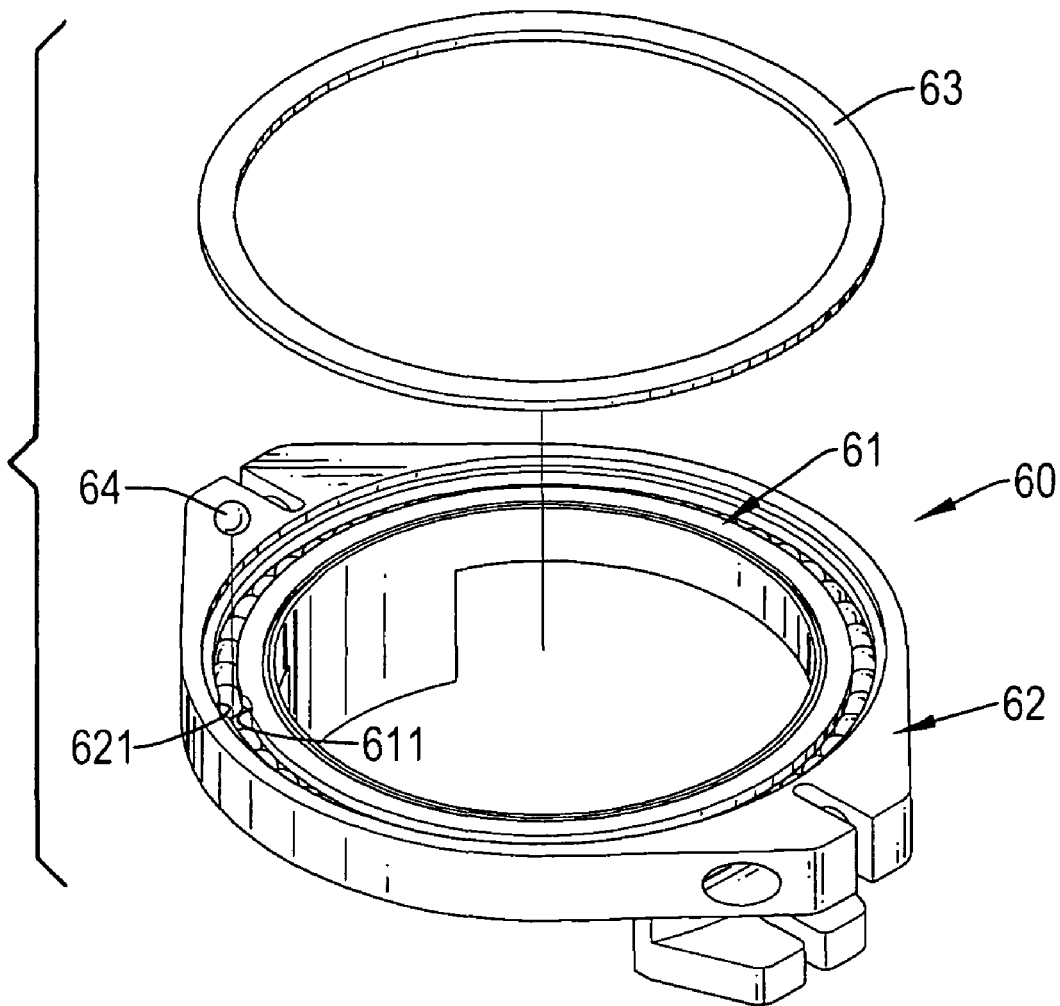
FIG. 7 is an exploded perspective view of a rotator in accordance with the prior art.

With reference to FIGS. 4 to 6, to assemble the rotator, the grease (40) is filled firstly into the chamber (22) of the rotating collar (20), and the balls (24) are then put into the mounting channel (23) of the rotating collar (20). After the balls (24) being put in the mounting channel (23), the mounting bracket (10) is pressed into the chamber (22) in the rotating collar (20). With the arrangement of the kerf (112), the mounting ring (11) can be slightly compressed and deformed for being mounted into the chamber (22) of the rotating collar (20) via the lower through hole (212). Then, the pressing force for mounting the mounting bracket (10) into the chamber (22) is released, and the inclined edges of the kerf (112) will make the mounting ring (11) returning to the original shape. Consequently, the mounting channel (111) aligns with the mounting channel (23) in the rotating collar (23) to hold the balls (24) inside the channels (111,23), and the holding groove (114) corresponds to and aligns with the lower through hole (212) in the rotating collar (20). Finally, the holding ring (30) is pressed into the mounting ring (11) from the lower through hole (212) of the rotating collar (20) to make the engaging groove (31) engaging and pressing against the annular flange (113). After the holding ring (30) being pressing into the mounting ring (11), the balls (24) can be held in the mounting channels (111, 23) and the mounting bracket (10) is firmly combined with the rotating collar (20).

The rotator as described has the following advantages.

1. The balls (24) can be assembled in the mounting channels (111, 23) quickly with a process of filling the grease (40) in the chamber (22), pressing the mounting ring (1) into the chamber (22) with the arrangement of the kerf (112) and pressing the holding ring (30) into the mounting ring (11), so to assemble the rotator is convenient.

2. The balls (24) are mounted in the mounting channels (111, 23) and is covered by the top of the rotating collar (20) and the mounting ring (11) of the mounting bracket (10), dusty or impurities can be kept from clogging with the balls (24) and an additional cover is unnecessary. Therefore, the structure of the rotator can be simplified and the cost for manufacturing the rotator is reduced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rotator for a head tube of a bicycle comprising
   a mounting bracket being adapted to mount around the head tube of the bicycle and having
      a mounting ring being adapted to mount around the head tube and having
         an external surface;
         an inner surface;
         a diameter;
         a bottom;
         a mounting channel being formed around the external surface of the mounting ring;
         a kerf being obliquely formed through the mounting ring to form two inclined edges;
         an annular flange being annularly formed on and protruding from the internal surface of the mounting ring; and
         a holding groove being formed around the external surface of the mounting ring below the mounting channel; and
      two legs being oppositely mounted on the bottom of the mounting ring;
   a rotating collar being rotatably mounted around the mounting bracket and having
      a top;
      a bottom;
      a chamber being defined in the rotating collar between the top and the bottom and having
         a diameter;
         an inner surface; and
         grease being filled in the inner surface of the chamber;
      an upper through hole being formed through the top of the rotating collar, communicating with the chamber and having a diameter smaller than that of the chamber;
      a lower through hole being formed through the bottom of the rotating collar, communicating with the chamber and the upper through hole and having a diameter larger than that of the upper through hole;
      a mounting channel being formed in the inner surface of the chamber and communicating with the mounting channel of the mounting ring; and
      multiple balls being mounted in the mounting channels of the mounting ring and the rotating collar to make the rotating collar rotating relative to the mounting ring of the mounting bracket smoothly; and
   a holding ring being mounted in the mounting ring of the mounting bracket and having
      an outer surface; and
      an engaging groove being formed around the outer surface of the holding ring and engaging the annular flange on the mounting ring of the mounting bracket.

2. The rotator as claimed in claim 1, wherein the diameter of the lower through hole is smaller than that of the mounting ring, and the holding groove corresponds to and aligns with the rotating collar in the lower through hole.

3. The rotator as claimed in claim 2, wherein the kerf is formed through the mounting ring at an angle of 30° relative to the bottom of the mounting ring.

4. The rotator as claimed in claim 3, wherein the holding ring further has a diameter same as that of the upper through hole.

5. The rotator as claimed in claim 4, wherein each leg is L-shaped.

6. The rotator as claimed in claim 1, wherein the kerf is formed through the mounting ring at an angle of 30° relative to the bottom of the mounting ring.

7. The rotator as claimed in claim 1, wherein the holding ring further has a diameter same as that of the upper through hole.

* * * * *